United States Patent
Kass

(10) Patent No.: US 10,606,838 B2
(45) Date of Patent: Mar. 31, 2020

(54) RELATIONAL OPERATIONS BETWEEN DATABASE TABLES AND APPLICATION TABLES

(71) Applicant: International Business Machines Corporation, Armonk, NY (US)

(72) Inventor: Eric Kass, Mannheim (DE)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 15/345,093

(22) Filed: Nov. 7, 2016

(65) Prior Publication Data

US 2018/0081947 A1     Mar. 22, 2018

(30) Foreign Application Priority Data

Sep. 20, 2016   (GB) .................................. 1615963.4

(51) Int. Cl.
*G06F 7/00*        (2006.01)
*G06F 17/30*       (2006.01)
*G06F 16/2455*     (2019.01)
*G06F 16/28*       (2019.01)

(52) U.S. Cl.
CPC ........ *G06F 16/2456* (2019.01); *G06F 16/284* (2019.01)

(58) Field of Classification Search
CPC ............. G06F 16/2456; G06F 16/2282; G06F 16/258; G06F 16/284; G06F 16/8385
USPC ................................. 707/714, 737
See application file for complete search history.

(56) References Cited

U.S. PATENT DOCUMENTS

| | | | |
|---|---|---|---|
| 5,799,310 A | | 8/1998 | Anderson et al. |
| 7,702,649 B1 * | | 4/2010 | Bresch .................... G06F 16/86 707/999.104 |
| 7,908,266 B2 * | | 3/2011 | Zeringue ............... G06F 3/0481 707/714 |
| 8,005,854 B2 | | 8/2011 | Chawla et al. |
| 8,600,994 B1 * | | 12/2013 | Xu .......................... G06F 16/40 707/737 |
| 9,146,955 B2 * | | 9/2015 | Nos ...................... G06F 16/2423 |
| 2003/0037181 A1 * | | 2/2003 | Freed .................... G06F 9/4862 719/328 |

(Continued)

OTHER PUBLICATIONS

Kalcik, Anton; "Joining Data in the Memory With Data in the Database Table"; <https://kalcik.net/2014/01/05/joining-data-in-memory-with-data-in-database-table/>.

*Primary Examiner* — Hasanul Mobin
(74) *Attorney, Agent, or Firm* — Daniel C. Housley

(57) ABSTRACT

Disclosed aspects perform a join operation between a database table and second in-memory data of an application may be provided. The operation is expressed as an join query between first data residing in the relational database and second data residing in a memory space of an application. Aspects can include serializing rows of the second data into a character large binary object, generating a composite statement by decoding, using a table function, rows of the character large binary object into columns of associated database data-types. The rows are substrings of the character large binary object. Aspects may include sending the character large binary object and the composite statement to a relational database, executing it, and receiving a result.

16 Claims, 23 Drawing Sheets

(56) References Cited

U.S. PATENT DOCUMENTS

| | | | |
|---|---|---|---|
| 2003/0140308 A1* | 7/2003 | Murthy | G06F 16/86 |
| | | | 715/234 |
| 2005/0228828 A1* | 10/2005 | Chandrasekar | G06F 16/81 |
| 2009/0265335 A1* | 10/2009 | Hoffman | G06F 16/283 |
| 2011/0196890 A1 | 8/2011 | Pfeifle et al. | |
| 2011/0258225 A1* | 10/2011 | Taylor | G06F 16/2272 |
| | | | 707/769 |
| 2015/0149421 A1 | 5/2015 | Foebel et al. | |
| 2016/0055206 A1* | 2/2016 | Becerra | G06F 9/3887 |
| | | | 707/714 |

* cited by examiner

400

```
WITH joinTab (<Memory Columns>) AS (
    SELECT <Memory Column Decoder Definition>
    FROM TABLE (JOINTBUDF (CAST(? AS DBCLOB(1G) CCSID 13488),
                           CAST(? AS INT),
                           CAST(? AS INT))) AS Dummy)
// **** User SQL ****
SELECT <RDMS Columns and Memory Columns>
FROM <RDMS Table> JOIN joinTab ON <RDMS Column> = <Memory Column>
    ...
WHERE <Predicate referencing RDMS and Memory Columns> ...
```

FIG. 4

```
struct InMemoryTypes_t                // Column Descriptor
    {
    char *ColumnName,
    int DataType,
    int Length,
    int Scale
    } =
    } InMemoryTypes[] =
    {
            {"MANDT",GRAPHIC,3,0},
            {"CONNID",GRAPHIC,4,0},
            {"PASSENGER",GRAPHIC,32,0},
            {"BOOKDATE",TIMESTAMP,19,0},
            {"SEATROW",INTEGER,4,0},
            {"SEATCOL",BINARY,1,0},
            {"BAGWEIGHT",DECIMAL,5,2}
    }
```

FIG. 5

```
struct InMemoryData_t
{
char *MANDT;
char *CONNID;
char *PASSENGER;
char *BOOKDATE;
int SEATROW;
char SEATCOL;
double BAGWEIGHT;
} InMemoryData[] =
{
        {"000","2402","Eric","2015-05-02-
09.28.05",4,'A',24.02},
        {"000","3577","Inna","2016-06-02-
12.58.05",23,'C',32.04},
        {"000","9981","Juliia","2016-06-18-
08.36.00",23,'D',47.68},
        {"000","2402","Sainab","2016-02-12-
16.48.48",4,'B',62.00}
};
```

```
WITH joinTab (MANDT,
              CONNID,
              PASSENGER,
              BOOKDATE,
              SEATROW,
              SEATCOL,
              BAGWEIGHT) AS
                  (SELECT GRAPHIC(SUBSTRING(aRow,1,3),3),
                          GRAPHIC(SUBSTRING(aRow,4,4),4),
                          GRAPHIC(SUBSTRING(aRow,8,32),32),
                          GRAPHIC(SUBSTRING(aRow,40,19),19),
                          INT(SUBSTRING(aRow,59,11)),
                          BINARY(VARCHAR_BIT_FORMAT(
                             GRAPHIC(
                             SUBSTRING(aRow,70,2),2)),1),
                          DECIMAL(SUBSTRING(aRow,72,7),5,2)
                       FROM TABLE (JOINTABUDF(
                                CAST(? AS DBCLOB (1G)),
                                CAST(? AS INT),
                                CAST(? AS INT))) AS Dummy)
SELECT CARRID,
       SFLIGHT.CONNID,
       PLANETYPE,
       PASSENGER,
       FLDATE,
       BOOKDATE,
       SEATROW,
       SEATCOL,
       BAGWEIGHT
FROM SFLIGHT
    JOIN joinTab ON SFLIGHT.MANDT = joinTab.MANDT AND
                    SFLIGHT.CONNID = joinTab.CONNID
WHERE CARRID = ?
```

FIG. 7

```
CREATE OR REPLACE FUNCTION JOINTABUDF(allRows DBCLOB(1G),
                                      RecordLength INTEGER,
                                      RecordCount INTEGER)
        RETURNS TABLE (aRow DBCLOB(1G) CCSID 13488)
        LANGUAGE SQL
BEGIN
        DECLARE iRecord INTEGER DEFAULT 0;
        DECLARE RecordPos INTEGER DEFAULT 1;
        RecordLOOP: LOOP
                IF iRecord = RecordCount THEN
                        LEAVE RecordLOOP;
                END IF;
                PIPE (SUBSTRING(allRows,RecordPos,RecordLength));
                SET RecordPos = RecordPos + RecordLength;
                SET iRecord = iRecord + 1;
        END LOOP;
        RETURN;
END;
```

FIG. 8

```
// --------------------
// ---- joinTab CTE ----
// --------------------
WITH joinTab (%s) AS (
      SELECT %s
      FROM TABLE (JOINTABUDF(CAST(? AS DBCLOB(1G) CCSID 13488),
                             CAST(? AS INT),
                             CAST(? AS INT))) AS Dummy)
// ------------------
// ---- User SQL ----
// ------------------
SELECT CARRID, SFLIGHT.CONNID, PLANETYPE,
       LAST, FIRST, FLDATE, BOOKDATE,
       SEATROW, SEATCOL, BAGWEIGHT
FROM SFLIGHT JOIN joinTab ON SFLIGHT.MANDT = joinTab.MANDT
                         AND SFLIGHT.CONNID = joinTab.CONNID
WHERE CARRID = ?;
```

```
char* JoinTabCOLUMNList(InMemoryTypes, nCols)
    {
    for (int Col=0; Col < nCols; Col++)
        {
        const char* Name = InMemoryTypes[Col].ColumnName;
        if (Col) Canvas.printf(", ");
        Canvas.printf("%s",Name);
        }
    return Canvas.AquireBuffer();
    }
```

```
ConstructCTEList(InMemoryTypes)
    {
    size_t Pos = 0;
    for (int Col=0; Col < nCols; Col++)
        {
        if (Col) Canvas.printf(", ");
        Pos = ConstructCTEColumn(InMemoryTypes,Col,Pos);
    return;
    }
```

```
EncodeLOB(InMemoryTypes, nCols, nRows)
    {
    Pos = 0;
    for (unsigned Row=0; Row < nRows; Row++)
            {
            for (int Col=0; Col < nCols; Col++)
                    {
                    Pos = EncodeLOBColumn(InMemoryTypes,Row,Col,Pos);
                    }
            }
    return;
    }
```

```
size_t
EncodeLOBColumn(InMemoryTypes, Row, Col, u2char_t *Pos)
    {
    size_t Digits = InMemoryTypes[Col].Digits;
    size_t Scale = InMemoryTypes[Col].Scale;
    size_t Length = InMemoryTypes[Col].Length;
    int Type = InMemoryTypes[Col].Type;
    const char* Name = InMemoryTypes[Col].ColumnName;
    size_t FieldWidth = 0;
    switch (Type)
        {
        case DB_BIG_TYPE:
            FieldWidth = DB_BIG_TYPE_WIDTH;
            snprintfPAD(GetPos(),FieldWidth,
                        "%+0211d",
                        *(long long *)Data);
            break;
        case DB_INT_TYPE:
            FieldWidth = DB_INT_TYPE_WIDTH;
            snprintfPAD(GetPos(),FieldWidth,"%+010d",*(int *)Data);
            break;
        case DB_SHORT_TYPE:
            FieldWidth = DB_SHORT_TYPE_WIDTH;
            snprintfPAD(GetPos(),FieldWidth,"%+05d",*(short *)Data);
            break;
        case DB_FLOAT_TYPE:
            FieldWidth = DB_FLOAT_TYPE_WIDTH;
            snprintfPAD(GetPos(),FieldWidth,"%+0.20E",*(double*)Data);
            break;
        case DB_PACKED_TYPE:
            FieldWidth = Digits + 2;        // Dot and Sign.
            EncodePacked(GetPos(),FieldWidth,Data,Digits,Scale);
            break;
        case DB_CHAR_TYPE:
            FieldWidth = Length;
            CopyChar(GetPos(),Data,Length);
            break;
        case DB_BINARY_TYPE:
            FieldWidth = Length * 2
            EncodeBin(GetPos(),Data,Length);
            break;
        case DB_WCHAR_TYPE:
            FieldWidth = Length;
            CopyDBChar(GetPos(),Data,Length);
            break;
        case DB_TIMESTAMP_TYPE:
            FieldWidth = DB_TIMESTAMP_TYPE_WIDTH;
            CopyChar(GetPos(),Data,FieldWidth);
            break;
        }
    Pos += FieldWidth;
    return Pos;
    }
```

FIG. 14

```
EncodePacked(u2char_t *NData,
             size_t NDataLen,
             const char *Data,
             unsigned nDigits,
             unsigned Scale)
{
    if (nDigits % 2 == 0) nDigits++;
    unsigned i;
    const unsigned char *uData = (const unsigned char *)Data;
    u2char_t *OutPos = NData;
    size_t Width = (nDigits + 2) / 2;
    *OutPos++ = (uData[Width-1] & 0xF) == 0x0D ? L'-' : L'+';
    for (i=0; i < nDigits; i++)
        {
            if (nDigits - i == Scale) *OutPos++ = L'.';
            *OutPos++ = (uData[i/2] >> 4) + L'0';
            if (++i == nDigits) break;
            if (nDigits - i == Scale) *OutPos++ = L'.';
            *OutPos++ = (uData[i/2] & 0xF) + L'0';
        }
    if (nDigits - i == Scale) *OutPos++ = L'.';
    return;
}
```

FIG. 15

```
EncodeBin(u2char_t *HexData, const char *Data, size_t DataLen)
{
    static const u2char_t HexDigits[] =
        {
        '0','1','2','3','4','5','6','7',
        '8','9','A','B','C','D','E','F'
        };
    const unsigned char *InPos = (const unsigned char *)Data;
    u2char_t *OutPos = HexData;
    size_t Remaining = DataLen;
    while (Remaining)
        {
        unsigned char nibbleL = (*InPos) >> 4;
        unsigned char nibbleR = (*InPos) & 0xF;
        *OutPos++ = HexDigits[nibbleL];
        *OutPos++ = HexDigits[nibbleR];
        InPos++;
        Remaining--;
        }
    return;
}
```

```
snprintfPAD(u2char_t *CharData, size_t Width, const char *format, ...)
{
    va_list args;
    va_start(args,format);
    char *tmp = (char *)alloca((Width + 1) * sizeof(u2char_t));
    int rc = vsnprintf(tmp,Width+1,format,args);
    va_end(args);
    if (rc >= 0)                  // Padded and NULL terminated.
        {
        size_t Length = (size_t)rc;
        if (Length > Width) Length = Width;
        for (size_t i=0; i < Length; i++)
            {
            CharData[i] = tmp[i]; // Latin-1 ASCII 2 UNICODE.
            }
        while (Length < Width) CharData[Length++] = L' ';
        }
    return;
}
```

```
bool CopyDBChar(u2char_t *CharData, const char *Data, size_t CharLen)
    {
        u2char_t *OutPos = CharData;
        const u2char_t *InPos = (const u2char_t *)Data;
        size_t Remaining = CharLen;
        while (Remaining)
            {
                *OutPos++ = *InPos++;
                Remaining--;
            }
        return true;
    }
```

1900

```
bool CopyChar(u2char_t *CharData, const char *Data, size_t CharLen)
        {
        u2char_t *OutPos = CharData;
        const char *InPos = Data;
        size_t Remaining = CharLen;
        while (Remaining)
                {
                char inChar = *InPos++;
                *OutPos++ = (u2char_t)inChar;
                Remaining--;
                }
        return true;
        }
```

```
000000  30003000 30003200 34003000 3200CDCD  ASCII 0.0.0.2.4.0.2...
000010  CDCDCDCD CDCDCDCD CDCDCDCD CDCDCDCD  ................
000020  CDCDCDCD CDCDCDCD CDCDCDCD CDCDCDCD  ................
000030  CDCDCDCD CDCDCDCD CDCDCDCD CDCDCDCD  ................
000040  CDCDCDCD CDCDCDCD CDCDCDCD CDCD4500  ...............E.
000050  72006300 63000000 00000000 00000000  r.c.............
000060  00000000 00000000 00000000 00000000  ................
000070  00000000 2B003800 39003200 34003100  ....+.8.9.2.4.1.
000080  36003000 35003000 20003000 34002B00  6.0.5.0. .0.4.+.
000090  34003100 30002E00 30003000 30003000  4.1.0...0.0.0.0.
0000A0  30003300 35003700 3700CDCD CDCDCDCD  0.3.5.7.7.......
0000B0  CDCDCDCD CDCDCDCD CDCDCDCD CDCDCDCD  ................
0000C0  CDCDCDCD CDCDCDCD CDCDCDCD CDCDCDCD  ................
0000D0  CDCDCDCD CDCDCDCD CDCDCDCD CDCDCDCD  ................
0000E0  CDCDCDCD CDCDCDCD CDCD4900 6E006E00  ..........I.n.n.
0000F0  61000000 00000000 00000000 00000000  a...............
000100  00000000 00000000 00000000 00000000  ................
000110  2B003900 30003900 31003900 33003200  +.9.0.9.1.9.3.2.
000120  36003600 20003100 37002B00 34003300  6.6. .1.7.+.4.3.
000130  30002E00 30003000 30003000 30003900  0...0.0.0.0.0.9.
000140  39003800 3100CDCD CDCDCDCD CDCDCDCD  9.8.1...........
000150  CDCDCDCD CDCDCDCD CDCDCDCD CDCDCDCD  ................
000160  CDCDCDCD CDCDCDCD CDCDCDCD CDCDCDCD  ................
000170  CDCDCDCD CDCDCDCD CDCDCDCD CDCDCDCD  ................
000180  CDCDCDCD CDCD4A00 75006C00 69006900  ......J.u.l.i.i.
000190  61000000 00000000 00000000 00000000  a...............
0001A0  00000000 00000000 00000000 2B003900  ............+.9.
0001B0  30003900 31003900 33003200 36003600  0.9.1.9.3.2.6.6.
0001C0  20003100 37002B00 34003400 30002E00  .1.7.+.4.4.0...
0001D0  30003000 30003000 30003200 34003000  0.0.0.0.0.2.4.0.
0001E0  3200CDCD CDCDCDCD CDCDCDCD CDCDCDCD  2...............
0001F0  CDCDCDCD CDCDCDCD CDCDCDCD CDCDCDCD  ................
000200  CDCDCDCD CDCDCDCD CDCDCDCD CDCDCDCD  ................
000210  CDCDCDCD CDCDCDCD CDCDCDCD CDCDCDCD  ................
000220  CDCD5300 63006900 6E006100 62000000  ..S.c.i.n.a.b...
000230  00000000 00000000 00000000 00000000  ................
000240  00000000 00000000 2B003900 30003900  ........+.9.0.9.
000250  31003900 33003200 36003600 20003000  1.9.3.2.6.6. .0.
000260  34002B00 34003200 30002E00 30003000  4.+.4.2.0...0.0.
```

```
WITH joinTabA (<Memory Columns Table A>) AS (
    SELECT <Memory Column Decoder Definition for Table A>
    FROM TABLE (JOINTABUDF(CAST(? AS DBCLOB(1G) CCSID 13488),
                          CAST(? AS INT),
                          CAST(? AS INT))) AS DummyA),
    joinTabB (<Memory Columns Table B>) AS (
    SELECT <Memory Column Decoder Definition for Table B>
    FROM TABLE (JOINTABUDF(CAST(? AS DBCLOB(1G) CCSID 13488),
                          CAST(? AS INT),
                          CAST(? AS INT))) AS DummyB)
```

FIG. 21

RELATIONAL OPERATIONS BETWEEN DATABASE TABLES AND APPLICATION TABLES

BACKGROUND

The present disclosure relates generally to performing a relational join operation between a database table and non-database data, and more specifically to a performing a join operation between a database table and second in-memory data of an application.

In a relational database (RDMS), a JOIN operation combines columns of multiple tables into a wider table (result set) by defining relations between columns of each table. The typical join relation is between the primary key of one table and a key of another table. A simple example is a table containing people primary-keyed by social security number, and a secondary table containing telephone numbers; each associated to a person identified by the person's social security number being a key in the second table or, a so-called foreign key. The SQL expression for such a relation can look something like:

SELECT Name, Telephone FROM Persons LEFT OUTER JOIN Telephone ON People.SSN=Telephone.SSN WHERE Person.Name="Eric"

Both, the Person table and the Telephone table are stored within the RDMS. In the case where a relationship exists between tables not within the RDMS, some systems provide a method to also access tables of another RDMS transparently. There also exist methods by which an application can perform a relational JOIN to data external to the RDMS by firstly temporally creating a table within the RDMS, secondly filling the table with application data, and finally issuing a relational JOIN query. This method incurs a significant overhead and is usually only viable for complex joins and middle sized application tables. A second, alternative method to achieve program a generic relational query between RDMS and external data requires RDMS support for something called generic table functions. However, known technologies would require dedicated support as part of the database in order to join data from a database table and data residing in the memory space of an application, known as "in-memory". Because in-memory data management by programs and related systems are a foundation of big transient data based applications, there is a need for efficient join methods for performing relational operations with data from an application and data residing within any native RDMS.

SUMMARY

According to an aspect of the present disclosure, a method for performing a join operation between a database table and second in-memory data of an application may be provided. The operation may be expressed as a join query between first data residing in the relational database and second data residing in a memory space of an application. The method may comprise serializing rows of the second data from the application into a character large binary object, and generating a composite statement comprising of a section that decodes rows of the character large binary object into columns of associated database data-types, wherein the rows are substrings of the character large binary object resulting from a table function and further comprising of a section containing text of the join query. The method may include sending the character large binary object and the composite statement to the relational database, executing the composite statement between a database table and the character large binary object in the relational database, and receiving a result of the executing the composite statement to the application.

According to another aspect of the present disclosure, a related system for performing the join operation between the database table and in-memory data of the application may be provided. Embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

Figure 1:
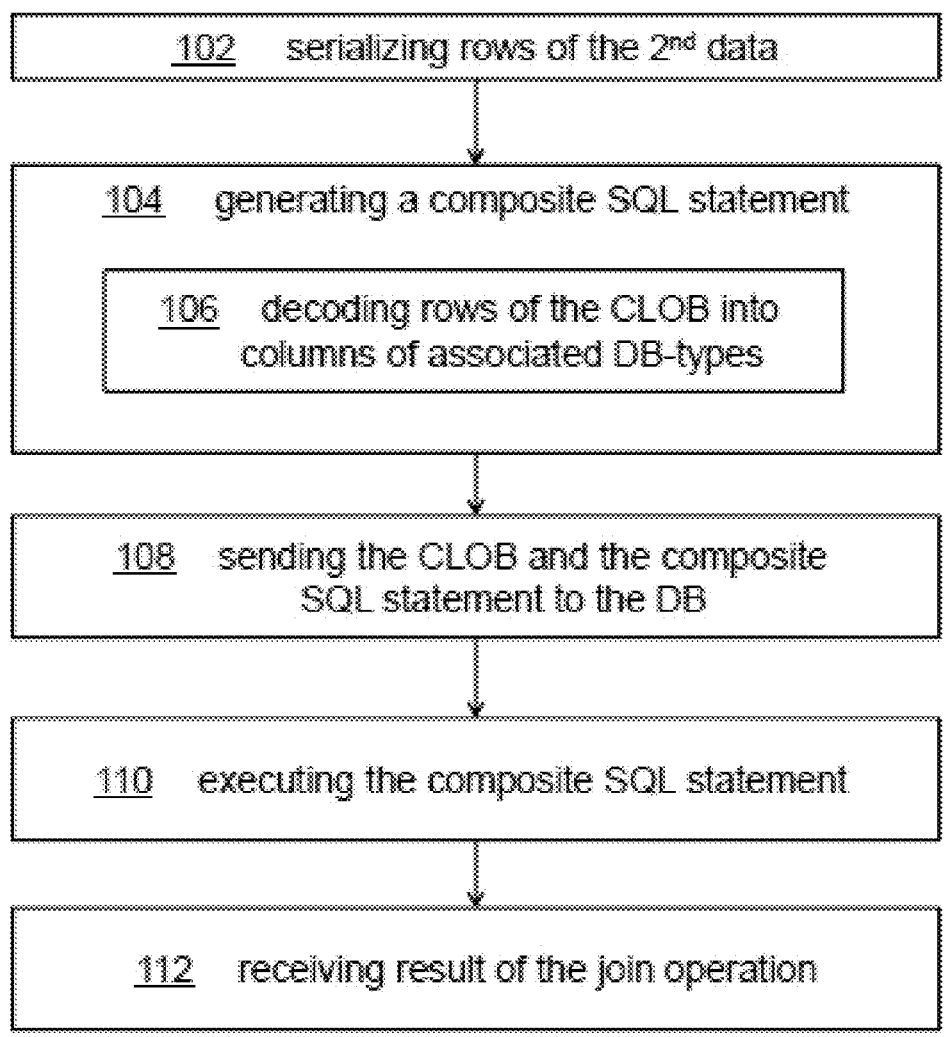

Embodiments of the invention will be described, by way of example only, and with reference to the following drawings:

FIG. 1 shows a block diagram of an embodiment for performing a join operation between a database table and second in-memory data of an application.

Figure 2:
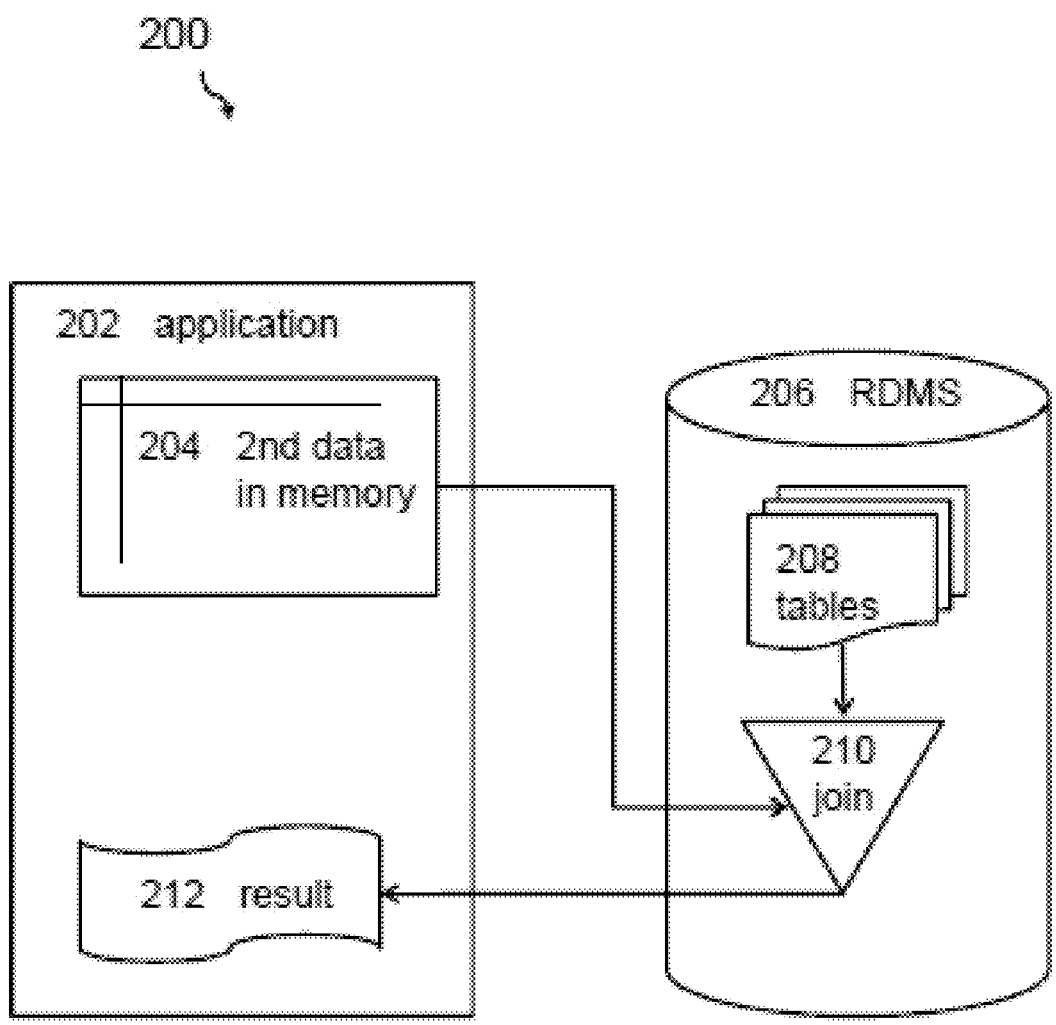

FIG. 2 shows another block diagram related to performing a join operation between a database table and second in-memory data of an application according to embodiments.

Figure 3:
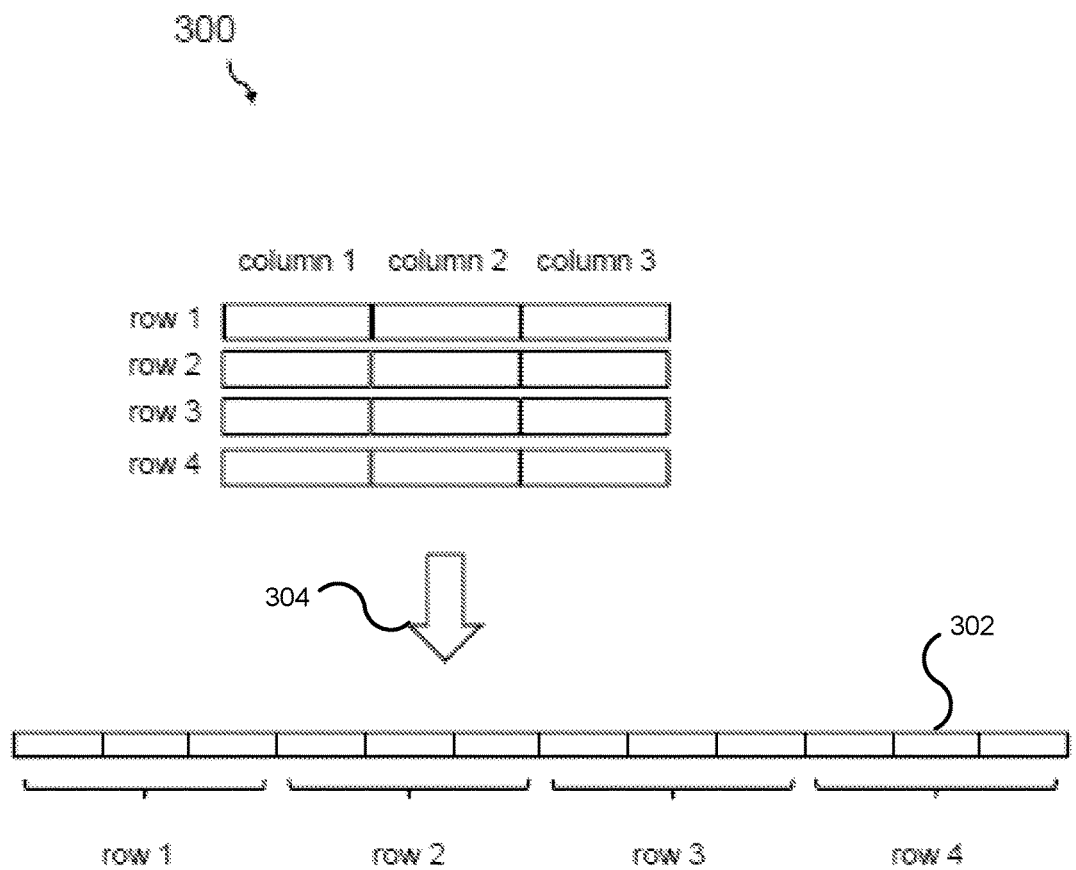

FIG. 3 shows a block diagram of an embodiment of a serialization of table data.

FIG. 4 shows an embodiment of a typical SQL expression of the disclosure.

FIG. 5 shows an embodiment of a column descriptor for an in-memory table.

FIG. 6 shows an example of an in-memory table.

FIG. 7 shows an embodiment of a JOIN expression between a table and in-memory data.

FIG. 8 shows an embodiment of a User Defined Table Function.

FIG. 9 shows an embodiment of a CTE generation template.

FIG. 10 shows an embodiment of a CTE column name list generator.

FIG. 11 shows an embodiment of a CTE column definition list generator.

Figure 12:

FIG. 12 shows an embodiment of a CTE column definition generator.

FIG. 13 shows an embodiment of a row-by-row/column-by-column CLOB encoder.

FIG. 14 shows an embodiment of a single column CLOB encoder.

FIG. 15 shows an embodiment of a packed decimal CLOB encoder.

FIG. 16 shows an embodiment of a binary data CLOB encoder.

FIG. 17 shows an embodiment of a padding column text CLOB encoder.

Figure 18:

FIG. 18 shows an embodiment of a Unicode text column CLOB encoder.

FIG. 19 shows an embodiment of a latin-1 ASCII text column CLOB encoder.

FIG. 20 shows a HEX dump of a LOB of the example of FIG. 4.

FIG. 21 shows an embodiment of a multiple application table JOIN expression.

Figure 22:
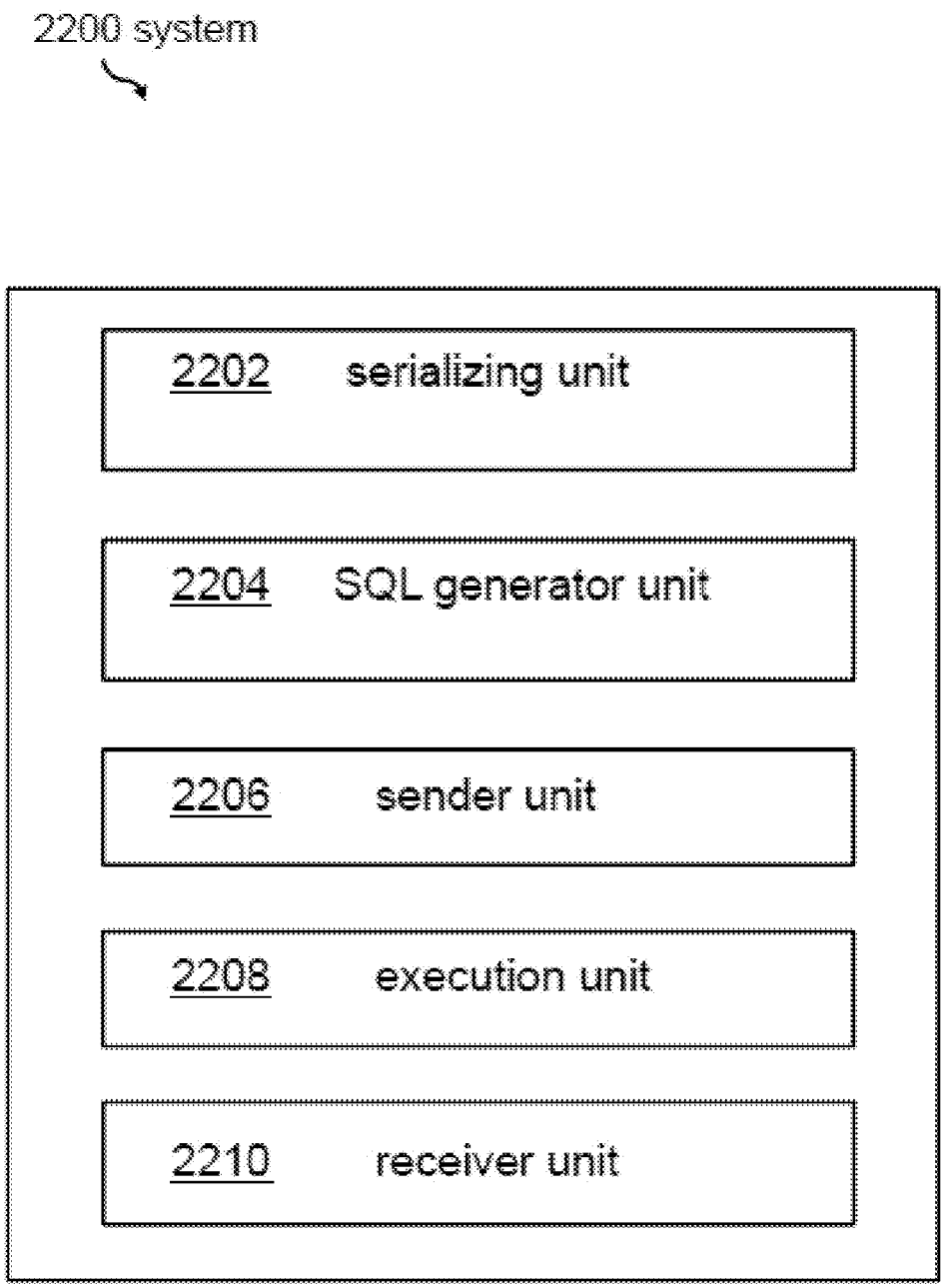

FIG. 22 shows an embodiment of the system for performing a JOIN operation between a database table and second data residing in a memory space of an application.

Figure 23:
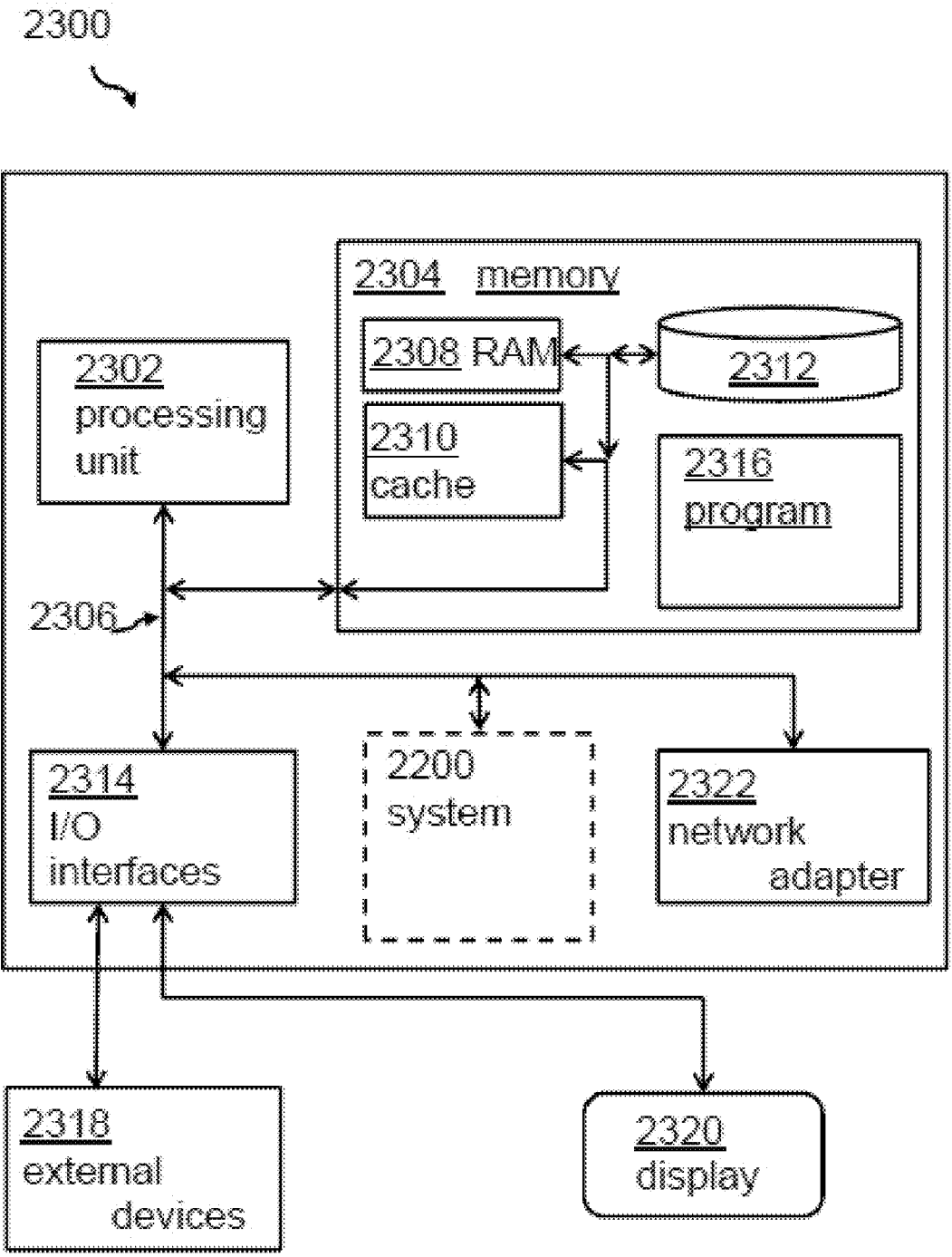

FIG. 23 shows an embodiment of a computing system for performing a JOIN operation.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

In the context of this description, the following conventions, terms and/or expressions may be used:

The term 'relational database' may denote a digital database whose organization is based on the relational model of data, as proposed by E. F. Codd in 1970. The various software systems used to maintain relational databases are known as a relational database management system (RDBMS). Virtually all relational database systems use SQL (Structured Query Language) as the language for querying and maintaining the database.

The term 'SQL join query' or SQL join clause may combine columns from one or more tables in a relational database. It may create a set that can be saved as a table or used as is. A JOIN is a means for combining columns from one (self-table) or more tables by using values common to each. ANSI-standard SQL specifies five types of JOIN: INNER, LEFT OUTER, RIGHT OUTER, FULL OUTER and CROSS. As a special case, a table (base table, view, or joined table) can JOIN with itself in a self-join. Typically, a programmer may declare a JOIN statement to identify rows for joining. If the evaluated predicate is true, the combined row is then produced in the expected format, a row set or a temporary table.

Here, the SQL statement, in particular an SQL JOIN statement, is extended to also allow a join operation of first data stored in table format of a relational database and second data not part of the database, but part of an in-memory data pool managed for or by an application.

The term 'character large binary object' (CLOB) may denote a collection of character data in a database management system, usually stored in a separate location that is referenced in the table itself. CLOBs usually have very high size-limits, of the order of 2 GB or more. The tradeoff for the capacity usually is limited access methods. In particular, some database systems limit certain SQL clauses and/or functions, such as LIKE or SUB STRING from being used on CLOBs. —Database systems vary in their storage patterns for CLOBs. Some systems always store CLOBs as a reference to out-of-table data, while others store small CLOBs in-table, changing their storage patterns if and when the size of the data grows beyond a threshold. Other systems are configurable in their behavior. —CLOBs need to be differentiated from BLOBs, because CLOBs may have a specified character encoding, and they differentiate themselves also by the capability to permit some string-oriented operations on them.

The term 'composite SQL statement' may denote an SQL statement enabled to perform an operation—in particular a JOIN operation—of database table data and data not residing in the database.

The term 'table function' may denote program code referenced by an SQL statement occurring textually in place of a name to an actual RDMS table (e.g. "SELECT * FROM myTableFunction(a,b,c)"). The 'table function' may return a table as output, processed by the SQL engine "as if" the data had resided within an RDMS table.

The term 'ASCII', abbreviated from American Standard Code for Information Interchange, may denote a character encoding standard (the Internet Assigned Numbers Authority (IANA) prefers the name US-ASCII). ASCII codes represent text in computers, telecommunications equipment, and other devices. Most modern character-encoding schemes are based on ASCII although they support many additional characters.

The term 'UCS2' or, Universal Coded Character Set (UCS), may denote a standard set of characters defined by the International Standard ISO/IEC 10646, Information technology Universal Coded Character Set (UCS) (plus amendments to that standard), which is the basis of many character encodings. The UCS contains over 128,000 abstract characters, each identified by an unambiguous name and an integer number called its code point. Characters (letters, numbers, symbols, ideograms, logograms, etc.) from the many languages, scripts, and traditions of the world are represented in the UCS with unique code points. The inclusiveness of the UCS is continually improving as characters from previously unrepresented writing systems are added.

The term 'UTF32' or UCS-4 may denote the Unicode Transformation Format 32 bits. It is a protocol to encode Unicode code points that uses exactly 32 bits per Unicode code point. This makes UTF-32 a fixed-length encoding, in contrast to all other Unicode transformation formats which are variable-length encodings. The UTF-32 form of a code point is a direct representation of that code point's numerical value. —The main advantage of UTF-32, versus variable-length encodings, is that the Unicode code points are directly index-able. Examining the n'th code point is a constant time operation. In contrast, a variable-length code requires sequential access to find the n'th code point. This makes UTF-32 a simple replacement in code that uses integers to index characters out of strings, as was commonly done for ASCII.

UTF-32 is pretty space inefficient, using four bytes per code point. Non-BMP characters are so rare in most texts; they may as well be considered non-existent for sizing issues making UTF-32 up to twice the size of UTF-16 and up to four times the size of UTF-8.

Aspects described herein for performing a join operation between a database table and second in-memory data of an application may offer multiple advantages and technical effects:

A JOIN operation between data residing in a table of a relational database and data not residing in the database may be performed. Disclosed aspects may have performance, efficiency, or logistical advantages/benefits compared to creating, filling, joining, deleting temporary database tables to process application and database data together. Aspects of the disclosure may have technical advantages over other methods requiring priority relational database support; as the current method can be used with any industry standard RDMS offering user defined table functions (user defined functions that return a complete table).

The current method is of particular interest to applications processing transient big data together with data persistent in relational databases.

According to embodiments, data values in the character large binary object (CLOB) may be represented by a one byte ASCII representation, a two byte UCS2 representation or a four byte UTF32 representation. Thus, all data values—be it numbers or letters—may be encoded as characters in various formats. E.g., a C language real value having 4 bytes may be ASCII-represented in a string format identified by % s. Hence, the value 3.14159265359 may be represented by 13 ASCII characters.

According to embodiments, the second data may be organized in rows with columns of fixed lengths. This may allow a stringent encode and decode function to serialize or de-serialize a data table into or out of the CLOB.

According to various embodiments, the second data may be organized in rows with columns of variable lengths. This may require also encoding the format and/or data representation together with the data in the CLOB. The format of each column may be stored only once in a CLOB.

According to various embodiments, the columns of the second data may be encoded with a variable length encoding multi-byte ASCII, UTF-8, or UTF-16, wherein columns of the second data are padded with space characters up to a maximum column width for a related data type and character set. Thus, a 10 character UTF-8 field would be encoded into a 40 byte field because UTF-8 requires up to 4 bytes per character. Hence, the CLOB may quickly reach a sizable length.

According to various embodiments, also a Null indicator may be encoded in the table large binary object. This may help to save some space within the CLOB.

According to embodiments, the table function may be a user defined table function written in procedural SQL. When supported by the RDMS, a table function written in SQL lends itself well to inlining by the RDMS optimizer. The logistical lifecycle administration of an SQL user defined table function may be considerably simpler than a user defined table function written in another programming language.

According to embodiments, the table function may be an external user defined table function written in any programming language. This may allow a higher degree of programmer freedom and another option if a particular RDMS does not offer procedural SQL sufficiently complex to perform the required processing of converting a single CLOB into a table of rows of CLOB.

According to embodiments, a decoding portion of the composite SQL statement may be represented as a Common Table Expression (CTE). A skilled person may know that, in SQL, a Common Table Expression is a temporary named result set, derived from a simple query and defined within the execution scope of a SELECT, INSERT, UPDATE, or DELETE statement. CTEs may be thought of as alternatives to derived tables (subquery), views, and inline user-defined functions. The implementation using a CTE gives high design freedom.

According to embodiments, the second data may represent one or more application data tables. Hence, the technique may not only work for one in-memory table but also for a plurality of in-memory data tables, all of which may be serialized into one or more CLOB(s) Hence, aspects described herein may be scalable.

In the following, a detailed description of the figures will be given. All instructions in the figures are schematic. Firstly, a block diagram of an embodiment of the inventive method for performing a join operation between a database table and second in-memory data of an application is given. Afterwards, further embodiments as well as embodiments of the system for performing a join operation between a database table and second in-memory data of an application will be described.

FIG. 1 shows a block diagram of an embodiment of the computer-implemented method 100 for performing an operation in a relational database. A standard database may be sufficient. The database does not have any specifics, in particular not special modifications in order to support the aspects described herein. The operation is expressed as an SQL join query between first data residing in the relational database and second data residing in a memory space of an application. However, the data may also come from an application server maintained by a different application. The method comprises serializing, 102, rows of the second data from the application into a character large binary object, in particular into a table CLOB. This may be performed as part of the application (compare FIGS. 14 to 19).

The method may further comprises generating, 104, a composite SQL statement comprising a section that decodes, 106, rows of the character large binary object into columns of associated database data-types, wherein the rows are substrings of the character large binary object resulting from a table function, and further comprising a section containing SQL text of the SQL join query. The rows—known as row CLOBs—are substrings of the character large binary object.

The method comprises additionally, sending, 108, the character large binary object and the composite SQL statement to a relational database, which may optionally be remote, executing, 110 the composite SQL statement—which is the SQL join query—between the database table and the character large binary object—which, in sum also represents a table—in the relational database, and receiving, 112, a result of the executing the composite SQL statement to the application for further processing.

FIG. 2 shows a block diagram 200 of another representation of the involved constituents. The application 202 comprises the 2nd data 204 as a component of the memory managed for or by the application. The RDMS 206 comprises a plurality of tables 208. A join operation 210 may be performed one one or more of the tables 208 and the 2nd data 204. The result 212 may be delivered to the application 202.

FIG. 3 shows a block diagram 300 of a serialization of the 2nd data. The upper part of FIG. 3 shows 4 rows with 3 columns each. The representation may suggest that the columns have a fixed length. That is possible but not required. The CLOB 302 has the 4 rows one after the other as a long string of characters. The arrow 304 represents the process of serialization.

FIG. 4 represents a typical SQL expression 400 of the disclosure. The normal printed parts are the Common Table Expression (CTE) that (1) defines the application table to the RDMS, and (2) deciphers the rows of the application table into columns (underlined text). The italic text represents the inventive kernel of the User Defined Table Function (UDTF) that de-serializes the application table data into rows. The bold text is the specification of the Character Large Binary Object (CLOB) UDTF input.

To demonstrate the aspects of the disclosure, an example is used throughout. The example consists of a database table containing airplane flight information, SFLIGHT; and a memory table containing passengers. Both will be queried with an SQL JOIN and supplementary predicate expression. The example passenger table has the data structure as shown in table 1:

TABLE 1

| Name | Type | Length |
|---|---|---|
| MANDT | GRAPHIC | 3 |
| CARRID | GRAPHIC | 3 |
| CONNID | GRAPHIC | 4 |
| FLDATE | GRAPHIC | 8 |
| PLANETYPE | GRAPHIC | 10 |
| SEATSMAX | INTEGER | 9 |

The flight information itself is defined in the example SFLIGHT table on the database server itself. A few rows of the table are shown in the following table 2:

TABLE 2

| MANDT | CARRID | CONNID | FLDATE | PRICE | CURRENCY | PLANETYPE | SEATSMAX |
|---|---|---|---|---|---|---|---|
| 0 | AC | 820 | 2002 Dec. 20 | 1222 | CAD | A330-300 | 320 |
| 0 | AF | 820 | 2002 Dec. 23 | 2222 | EUR | A330-300 | 320 |
| 0 | LH | 400 | 1995 Feb. 28 | 899 | DEM | A319 | 350 |
| 0 | LH | 454 | 1995 Nov. 17 | 1499 | DEM | A319 | 350 |
| 0 | LH | 455 | 1995 Jun. 6 | 1090 | USD | A319 | 220 |

The application table used as example in this document is expressed in a C-language syntax and consists of two structures. The first structure describes the column names and types as, provided to the database engine. This structure is called a Column Descriptor and consists of a list of information about each column including column name, data type, field length, and other attributes necessary to describe the column to the database engine. The example Column Descriptor in FIG. 5 defines the fields portraying a passenger booking on a flight. The industry standard ODBC SQLDescribeCol( ) API may deliver similar information compared to the ones contained in Column Descriptor and which utilized according to aspects described herein.

The second example structure represents a table within the application. The table consists of data corresponding to each field described in the first structure; namely, the actual flight data that will be joined to the SFLIGHT table on the database. Compare FIG. 6.

Given the example SFLIGHT table (table 2, FIG. 6) and example passenger information table (table 1, FIG. 5), an application using the disclosed aspects might define a query similar to one depicted in FIG. 7 showing an SQL JOIN expression 700 between a table and in-memory data.

The UDTF returns row-by-row LOB output from one input CLOB. An embodiment defines a User Defined Table Function (UDTF) shown in FIG. 8, JOINTABUDF. The table function returns a single large binary object for each row of the application table. The UDTF accepts one single large binary object (LOB) that encodes the entire table of the application into a single long character sequence, column-by-column, row-by-row as shown below in section describing the CLOB encoding of row and column data (compare section relating FIG. 13).

Next, the generation of the CTE expression will be described: In any specific case, an application can manually encode a CTE to match a table format used by the application. If the application tables are multiple, dynamically defined, or the implementation of the query generator is in a common component (driver), it may be pragmatic to use a generator for the CTE. As such, this is an example embodiment.

The CTE is dependent on the format of the application table. The generic CTE builder of various embodiments accepts a column descriptor and generates the associated SQL text of the CTE. The joinTab CTE section 900 in FIG. 9 is a generic C-language template for building the CTE. The first % s will be replaced by the list of columns by name of the application table. The second % s will be replaced by the LOB decoding column definitions.

The column list generated by various embodiments, builds a simple list of column names separated by commas. FIG. 10 shows a CTE column name list generator 1000.

The generated list of column names follows the CTE name (first % s in FIG. 10). The resulting SQL text of the example is:

WITH joinTab (MANDT,
CONNID,
PASSENGER,
BOOKDATE,
SEATROW,
SEATCOL,
BAGWEIGHT) AS . . .

Various embodiments construct the SELECT list of the CTE, casting or converting substrings of the CLOB rows delivered by the UDTF, JOINTABUDF. This SELECT list forms the decoder of aspects described herein. Because each data type has a different decoding, the embodiment iterates over the columns to produce the decoding SELECT list. The methods for decoding the CLOB are documented by way of pseudo-code segments as follows:

The main SELECT list builder loop 1100 of FIG. 11 (ConstructCTEList( )) iterates over each column described in the InMeoryTypes Column Descriptor, calling ConstructCTEColumn( ) for each one. FIG. 11 shows a related CTE column definition list generator.

In the following, the CLOB decoding of columns is discussed. The procedure ConstructCTEColumn( ) 1200 of FIG. 12 appends the proper decoding clause for the particular column to the SELECT list. The present embodiment encodes all types using a 2-byte fixed length Unicode format UCS-2. An equivalent implementation using the fixed length UTF-32 is a relatively simple modification. Using a variable length character encoding (e.g. UTF-8 or UTF-16) requires substrings to be sufficiently wide to store the maximum possible number of bytes for a particular logical character width (e.g., the maximum width of a UTF-8 character is 4 bytes).

Character types (WCHAR, TIMESTAMP) are decoded as simple substrings of the row CLOB. The cast to GRAPHIC (Unicode UCS-2 character string) of the SUB STRING function is mostly cosmetic, it sets the maximum limit of the character string equivalent to the field width. Single byte character strings are stored in UCS-2 in the LOB, so they are decoded as UCS-2.

Integer, Big Integer, Floating Point, and Packed use DB conversion functions to convert character representations of numeric formats back to their corresponding numeric counterparts (e.g. "12.34" in the CLOB is converted to a database Float or Packed: 12.34).

Similarly, binary data is converted from a two UCS-2 character per data byte HEX representation of binary data (e.g., the UCS-2 string "414243" is 12 bytes long, decodes to 0x414243 which is the ASCII representation of "ABC"). The decoding uses the Database VARCHAR_BIT_FORMAT to convert HEX character representation of binary data into binary data.

CLOB Encoding of Row and Column Data 1300 is shown in FIG. 13. The format of the LOB data may be as follows:

```
|Field0          |Field1 |Field2          |
|----------------|-------|----------------|
0:|CharData... [pad]|INTEGER|CharData... [pad]|
1:|CharData... [pad]|INTEGER|CharData... [pad]|
```

The pseudo-code below in FIG. 13 encodes each row, column by column into a sequential double-byte Unicode character large binary object (DBCLOB). Each row has the same byte length as does each column. The present embodiment utilizes fixed length (padded) character columns, but variable length character columns are also possible as an alternative; these are described in the section "The CLOB encoding of row and column data for variable length" (compare the text after the text related to FIG. 20).

The encoding of column data corresponds one-to-one with the decoding construct within the CTE for the same column. For example, a packed binary coded decimal (BCD) type would have a definition in the CTE to convert a character representation of a decimal value into a decimal value: DECIMAL(SUBSTRING(aRow,Position,Width),Digits,Scale) and the EncodeLOBColumn( ) would stream the character representation of the decimal value that matches using the EncodePacked( ) function 1400 of FIG. 14)

In embodiments such as the present embodiment, u2char_t is a type definition for UCS2 character.

In the C language, the type could be defined as either of the following:

typedef wchar_t u2char_t;
typedef short u2char_t;

Various CLOB encoders for different standard data types follow in FIG. 15 and FIG. 16.

The simple 'print to counted string with padding' (snprintfPAD) C-function 1700 in FIG. 17 is a helper function used for the numeric types, to guarantee the textual representation of these types are padded with spaces.

The text encoders below assume the 'Data' pointer references application table columns that are already padded to the width of 'CharLen.' In cases wherein an application column string length varies from the column maximum length, the functions 1800 and 1900 in FIG. 18 and FIG. 19 would also need to be padded up until the maximum field length.

The Latin-1 ASCII Text Encoder simply promotes 7-bit ASCII to the UCS-2 Unicode equivalent. Any other single or multi-byte ASCII encoded application table column could be converted to UCS-2 using a standard method of conversion.

To demonstrate via example, the encoder as described herein would build DBCLOB hex dump 2000, shown in FIG. 20, from the example memory table in FIG. 4.

The CLOB encoding of row and column data for variable length fields may also be discussed shortly: An extension to the encoding method of CLOB Encoding of Row and Column Data is to incorporate variable string lengths at the beginning of each variable string field.

```
|Field0          |Field1 |Field2          |
|----------------------|-------|----------------------|
0:|[len]CharData... [dead]|INTEGER|[len]CharData... [dead]|
1:|[len]CharData... [beef]|INTEGER|[len]CharData... [beef]|
```

In this case, the field in the CTE would be defined as such:
SUB STRING(aRow,1+5,INTEGER(SUB STRING (aRow,1,5))),
INT(SUBSTRING(aRow,7,3))

Wherein DataLength is encoded in first 5 characters of string, but data is stored in the DBCLOB in fixed cells of maxlength.

It may also be noted that NULL or other indicators could as well be stored within the stream prior to the length (e.g. [ind][len]CharData|[ind]INTEGER| . . . ).

A Multiple Application Table Join 2100 is shown in FIG. 21. Thus, aspects described herein are not limited to one Application table per Join. The SQL syntax for Common Table Expressions provides for multiple definitions, as seen in FIG. 21. In a similar fashion, aspects of the disclosure do not preclude the ability to also define other CTEs, whether related or unrelated to aspects described herein, concurrently with CTE of the invention within any particular query.

FIG. 22 shows an embodiment of the system 2200 for performing an operation in a relational database. The operation is expressed as an SQL join query between first data residing in the relational database and second data residing in a memory space of an application. The system comprises a serializing unit 2202 adapted for serializing rows of the second data from the application into a character large binary object, and an SQL generator unit 2204 adapted for generating a composite SQL statement comprising a section that decodes rows of the character large binary object into columns of associated database data-types, wherein the rows are substrings of the character large binary object resulting from a table function, and further comprising a section containing SQL text of the SQL join query.

The system comprises further a sender unit 2206 adapted for sending the character large binary object and the composite SQL statement to a relational database, an execution unit 2208 adapted for executing the composite SQL statement between a database table and the character large binary object in the relational database, and a receiver unit 2210 adapted for receiving a returned result of the executing the composite SQL statement to the application.

Embodiments of the invention may be implemented together with virtually any type of computer, regardless of the platform being suitable for storing and/or executing program code. FIG. 23 shows, as an example, a computing system 2200 suitable for executing program code related to aspects described herein.

The computing system 2300 is only one example of a suitable computer system and is not intended to suggest any limitation as to the scope of use or functionality of embodiments of the invention described herein. Regardless, computer system 2300 is capable of being implemented and/or performing any of the functionality set forth hereinabove. In the computer system 2300, there are components, which are operational with numerous other general purpose or special purpose computing system environments or configurations. Examples of well-known computing systems, environments, and/or configurations that may be suitable for use with computer system/server 2300 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 2300 may be described in the general context of computer system-executable instructions, such as program modules, being executed by a computer system 2300. Generally, program modules may include routines, programs, objects, components, logic, data structures, and so on that perform particular tasks or implement particular abstract data types. Computer system/server 2300 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 2300 is shown in the form of a general-purpose computing device. The components of computer system/server 2300 may include, but are not limited to, one or more processors or processing units 2302, a system memory 2304, and a bus 2306 that couples various system components including system memory 2304 to the processor 2302. Bus 2306 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 2300 typically includes a variety of computer system readable media. Such media may be any available media that is accessible by computer system/server 2300, and it includes both, volatile and non-volatile media, removable and non-removable media.

The system memory 2304 may include computer system readable media in the form of volatile memory, such as random access memory (RAM) 2308 and/or cache memory 2310. Computer system/server 2300 may further include other removable/non-removable, volatile/non-volatile computer system storage media. By way of example only, storage system 2312 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 2306 by one or more data media interfaces. As will be further depicted and described below, memory 2304 may include at least one program product having a set (e.g., at least one) of program modules that are configured to carry out the functions of embodiments of the invention.

Program/utility 2314, having a set (at least one) of program modules 2316, may be stored in memory 2304 by way of example, and not limitation, as well as an operating system, one or more application programs, other program modules, and program data. Each of the operating system, one or more application programs, other program modules, and program data or some combination thereof, may include an implementation of a networking environment. Program modules 2316 generally carry out the functions and/or methodologies of embodiments of the invention as described herein.

The computer system/server 2300 may also communicate with one or more external devices 2318 such as a keyboard, a pointing device, a display 2320, etc.; one or more devices that enable a user to interact with computer system/server 2300; and/or any devices (e.g., network card, modem, etc.) that enable computer system/server 2300 to communicate with one or more other computing devices. Such communication can occur via Input/Output (I/O) interfaces 2314. Still yet, computer system/server 2300 may communicate with one or more networks such as a local area network (LAN), a general wide area network (WAN), and/or a public network (e.g., the Internet) via network adapter 2322. As depicted, network adapter 2322 may communicate with the other components of computer system/server 2300 via bus 2306. It should be understood that although not shown, other hardware and/or software components could be used in conjunction with computer system/server 2300. Examples, include, but are not limited to: microcode, device drivers, redundant processing units, external disk drive arrays, RAID systems, tape drives, and data archival storage systems, etc.

Additionally, the system 2200 for performing a join operation between a database table and second in-memory data of an application may be attached to the bus system 2306.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for performing an operation in a relational database, wherein the operation is expressed as a join query between first data residing in the relational database and second data residing in a memory space of an application, the method comprising:
    serializing rows of the second data from the application into a character large binary object, wherein the second data are organized in rows with columns of variable lengths, and wherein the columns of the second data are encoded with at least one of:
        a variable length encoding multi-byte ASCII;
        a variable length encoding UTF-8; and
        a variable length encoding UTF-16;
        wherein the columns of the second data are padded with space characters up to a maximum column width for a related data type and character set;
    generating a composite statement which includes:
        a section that decodes rows of the character large binary object into columns of associated database datatypes, wherein the rows are substrings of the character large binary object resulting from a table function, and
        a section containing text of the join query;
    sending the character large binary object and the composite statement to a relational database;
    executing the composite statement between a database table and the character large binary object in the relational database; and
    receiving a returned result of executing the composite statement to the application.

2. The method according to claim 1, wherein data values in the character large binary object are represented by a one byte ASCII representation.

3. The method according to claim 1, wherein data values in the character large binary object are represented by a two byte UCS2 representation.

4. The method according to claim 1, wherein data values in the character large binary object are represented by a four byte UTF32 representation.

5. The method according to claim 1, wherein the second data are organized in rows with columns of fixed lengths.

6. The method according to claim 1, wherein a Null indicator is encoded in the table large binary object.

7. The method according to claim 1, wherein the table function is a user defined table function written in SQL.

8. The method according to claim 1, wherein the table function is an external user defined table function written in a programing language which is predetermined.

9. The method according to claim 1, wherein the table function is an external user defined table function written in any programing language.

10. The method according to claim 1, wherein a decoding portion of the composite statement is represented as a Common Table Expression.

11. The method according to claim 1, wherein the second data represent one or more application data tables.

12. The method according to claim 1, wherein:
    the table function is an external user defined table function written in any programing language;
    a decoding portion of the composite statement is represented as a Common Table Expression; and
    the second data represent one or more application data tables.

13. The method according to claim 1, wherein:
    a Null indicator is encoded in the table large binary object;
    the table function is a user defined table function written in SQL;
    a decoding portion of the composite statement is represented as a Common Table Expression; and
    the second data represent one or more application data tables.

14. The method according to claim 13, wherein the second data are organized in rows with columns of variable lengths.

15. A system for performing an operation in a relational database, wherein the operation is expressed as a join query between first data residing in the relational database and second data residing in a memory space of an application, the system comprising:
    a memory having a set of computer readable computer instructions, and
    a processor for executing the set of computer readable instructions, the set of computer readable instructions including:
    serializing rows of the second data from the application into a character large binary object, wherein the second data are organized in rows with columns of variable lengths, and wherein the columns of the second data are encoded with at least one of:
        a variable length encoding multi-byte ASCII;
        a variable length encoding UTF-8; or
        a variable length encoding UTF-16;
        wherein the columns of the second data are padded with space characters up to a maximum column width for a related data type and character set;
    generating a composite statement which includes:
        a section that decodes rows of the character large binary object into columns of associated database datatypes, wherein the rows are substrings of the character large binary object resulting from a table function, and a section containing text of the join query;

sending the character large binary object and the composite statement to a relational database;

executing the composite statement between a database table and the character large binary object in the relational database; and receiving a returned result of executing the composite statement to the application.

16. A computer program product for performing an operation in a relational database, wherein the operation is expressed as a join query between first data residing in the relational database and second data residing in a memory space of an application, the computer program product comprising a computer readable storage medium having program instructions embodied therewith, wherein the computer readable storage medium is not a transitory signal per se, the program instructions executable by a processor to cause the processor to perform a method comprising:

serializing rows of the second data from the application into a character large binary object, wherein the second data are organized in rows with columns of variable lengths, and wherein the columns of the second data are encoded with at least one of:

a variable length encoding multi-byte ASCII;

a variable length encoding UTF-8; or a variable length encoding UTF-16;

wherein the columns of the second data are padded with space characters up to a maximum column width for a related data type and character set;

generating a composite statement which includes:

a section that decodes rows of the character large binary object into columns of associated database datatypes, wherein the rows are substrings of the character large binary object resulting from a table function, and a section containing text of the join query;

sending the character large binary object and the composite statement to a relational database;

executing the composite statement between a database table and the character large binary object in the relational database; and receiving a returned result of executing the composite statement to the application.

\* \* \* \* \*